United States Patent [19]

Morez

[11] 4,202,032

[45] May 6, 1980

[54] POWER CONTROL CIRCUIT

[75] Inventor: Gene Morez, Morton Grove, Ill.

[73] Assignee: Troller Corporation, Chicago, Ill.

[21] Appl. No.: 786,570

[22] Filed: Apr. 11, 1977

[51] Int. Cl.[2] ...................... H02M 7/02; H02M 7/217

[52] U.S. Cl. .................................... 363/126; 318/349; 323/94 R; 363/127

[58] Field of Search ............... 307/1, 2, 321; 318/232, 318/238, 345 B, 348, 349; 323/19, 22 T, 39, 40, 75 F, 94 R; 328/262; 363/44, 126, 127; 104/147 A, 152

[56] References Cited

U.S. PATENT DOCUMENTS

| | | | |
|---|---|---|---|
| 2,965,044 | 12/1960 | Johnson | 307/2 X |
| 3,109,135 | 10/1963 | Goldman | 323/22 T |
| 3,573,583 | 4/1971 | McCampbell et al. | 318/345 B |

FOREIGN PATENT DOCUMENTS

| | | | |
|---|---|---|---|
| 2322397 | 11/1974 | Fed. Rep. of Germany | 363/100 |

OTHER PUBLICATIONS

National Model Railroaders Association Bulletin, Nov. 1974, p. 41.

*Primary Examiner*—A. D. Pellinen

[57] ABSTRACT

A power control circuit providing a complete range of signals that vary from a full "off" to a full "on" condition comprising an arrangement of electrical components incorporated into a control device that supplies half wave signals at the minimum control position and blends the same into a full wave signal as the control device is activated to approach and reach maximum full "on" position.

6 Claims, 4 Drawing Figures

POWER CONTROL CIRCUIT

SUMMARY OF THE INVENTION

Many driven devices including universal or direct current motors use an unfiltered half or full wave rectified wave signal form with a means for controlling amplitude of said wave form so as to control response of the driven device.

The common practice presently used to control such driven devices is a variable resistance utilized to increase or decrease response to the driven device from the power circuit.

Because of the nature and construction of such driven devices, most of which incorporate a very inexpensive design, the response of such driven devices at low voltage regulated by the circuit, is extremely poor. This results from several reasons: Minimum number of magnetic poles; high rotational friction; and mechanical binding when such driven devices have gear ratioing mechanisms.

Most of the driven devices will not run smoothly at very low speeds because such devices will not respond at a voltage too low to overcome these inherent design problems.

The typical driven device may have as few as two poles, and the response from a full wave rectified signal, although better than pure direct current, is still insufficient to insure smooth performance.

Another problem in the devices of the prior art is the limited range of the control devices associated with the poor control circuits. Most of the control devices now used are incapable of complete responsive ranges because there is a point near minimum range when the control device is open. This is required to eliminate the power dissipation in the control device.

The control systems incorporated in the power circuits described above have the disadvantage of poor slow speed because of the open position of the control device at or near its minimum range.

It is the intent of this invention to overcome the objections to a power control circuit incorporating an adjustable control means, and which will provide a complete and smooth range of signals that vary from full "off" to full "on," without the use of external switch or electronic components. The invention will provide a control means that applies a half wave signal at the minimum settings and blends in a full wave signal as the control approaches its maximum optimum position. This is accomplished by adding a portion of an alternate current signal to the variable selection of the control means through its arrangement and connection in the power control circuit.

The invention will be best understood by reference to the accompanying drawings, in which there is shown the preferred form of circuitry for carrying out the objects of this invention, and in which.

Figure 1:
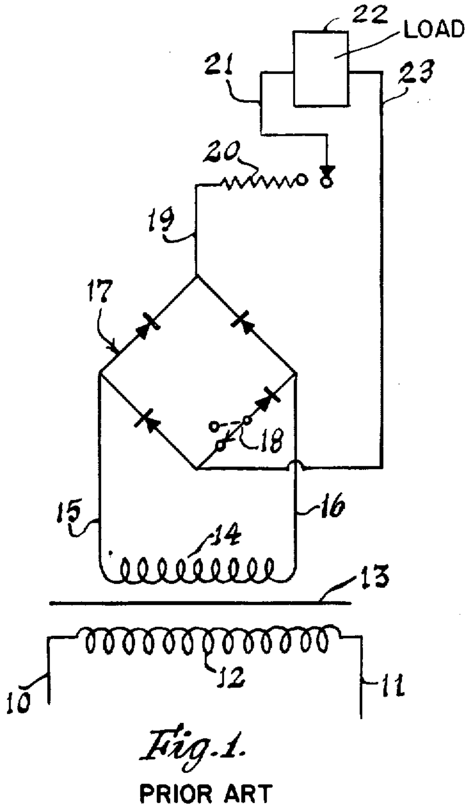
Fig.1. PRIOR ART
FIG. 1 is a schematic view of the present prior art devices.

The current practice in a power control circuit is schematically shown in FIG. 1, wherein there is schematically shown the leads 10 and 11 of a power source connected to the primary winding 12 of a transformer 13. The secondary winding 14 of the transformer 13 through leads 15 and 16 is connected to a rectifying means 17 having a bridge configuration which includes in one leg of the bridge a mode switch 18. Opposite legs of the rectifying means 17 are connected through a conductor 19 to a variable control member 20 which in turn through lead 21 is connected to one side of the load or driven device 22, the opposite side of the load or driven device 22 being connected by conductor 23 to an opposite leg of the rectifying means 17 in a manner well known in the art.

From this circuit the mode switch 18 in one leg of the bridge configuration of the rectifying means 17, when in an open position, will convert the rectifying means from being a full wave rectifier, to a half wave rectifier. By this construction the load or driven device 22, because of its inherent design, is more responsive to the applied voltage when the mode switch 18 is open and the rectifying means produces a half wave signal, thus permitting the load or driven device 22 to respond in small increments, overcoming the mechanical inherent design resistance. With this circuit a low speed response is achieved due to the presence of the half wave signal. However, such arrangement must include the mode switch 18 which has to be mechanically or periodically operated by the operator or controller of the power control circuit.

Figure 2:
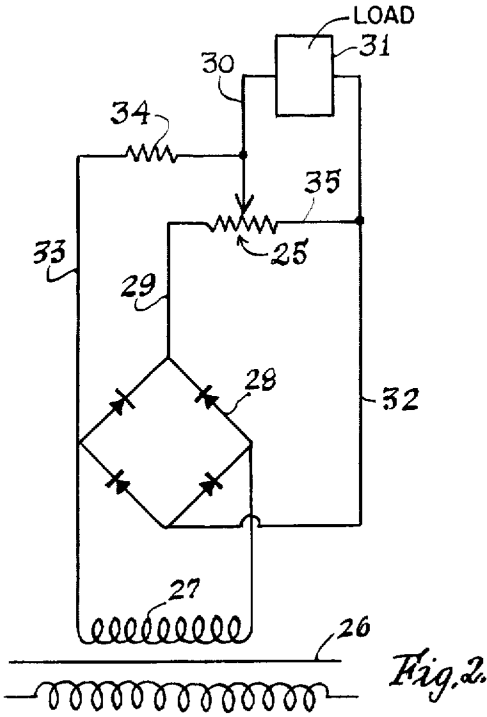
FIG. 2 is a schematic circuit of the power control circuit of this invention, including the control means associated therewith.

The present invention is directed to a power control circuit 24 schematically shown in FIG. 2, which includes a variable control means 25, which may be in the form of a wire wound, relatively high powered rheostat.

As shown in FIG. 2, there is a transformer 26, the secondary winding 27 of which is connected to a rectifying means 28 having a bridge configuration, although it should be noted that the full wave rectifier may be of the well-known center tap construction, without departing from the spirit of this invention.

By the rectifying means 28, a full wave signal is generated through conductor 29, the variable control means 25, conductor 30, to the load or driven member 31, and a return conductor 32 connected to an opposite leg of the bridge rectifying means 28.

To this circuit is added a conductor 33 which extends from one of the opposite legs of the bridge rectifying means 28 through a feed-back resistor 34, and terminating into the conductor 30 between the variable control means 25 and the load 31. It should also be pointed out that the variable control means 25 has a negative return conductor 35 which connects to the return conductor 32 previously identified.

By this arrangement there is incorporated in the power control circuit 24 of FIG. 2 in effect a mode switch which consists of a means of supplying a portion of the alternating current signal directly to the signal transmitted through the direct current control means 25 to the load or driven means 31 when the control means 25 is at its minimum operative position.

Figure 4:
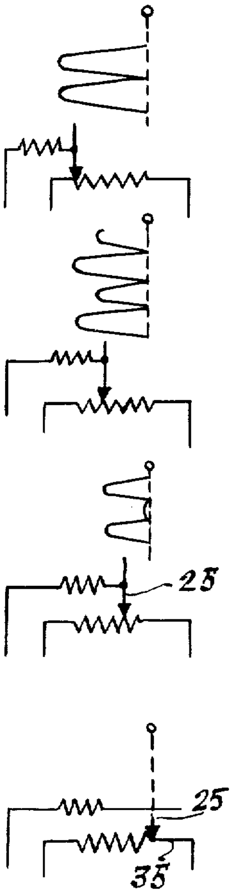
FIG. 4 is a fragmentary schematic view illustrating the wave form power control signal generated through the control circuits of this invention as illustrated in FIGS. 2 and 3.

By reference to FIG. 4, when the control means 25 is in its "off" position, no operative signal is applied to the load or driven member 31 by reason of the fact that the alternating current signal, following the path of least resistance, will return through the control device 25 and its negative return conductor 35 to the return conductor 32 without affecting the load or driven member 31.

As shown in the second progressive state of FIG. 4, when the control means 25 is advanced to its minimum operative position, the signal output thereof through the conductor 30 into the load or driven device 31, is a blend of full wave DC signal with a half wave AC signal so as to achieve a proper slow or smooth response therefrom by the driven number or load 31. As the control means 25 is moved through the range from minimum to maximum position as shown in the subsequent fregmentary schematics of FIG. 4, the signal blend of the half wave AC and the full wave DC is achieved so as to find full and proper response in the load or driven member 31.

The prior art also discloses a device for effecting slow speed response by incorporating in the power control circuit a S.C.R. controller. The inherent problem with using such a S.C.R. controller is the fast rise time when the S.C.R. switch is on at times other than when the AC signal is at or near zero. If these circuits are to be practical, the fast rise time is intergraded, which then brings into the circuitry an added expensive component.

Figure 3:
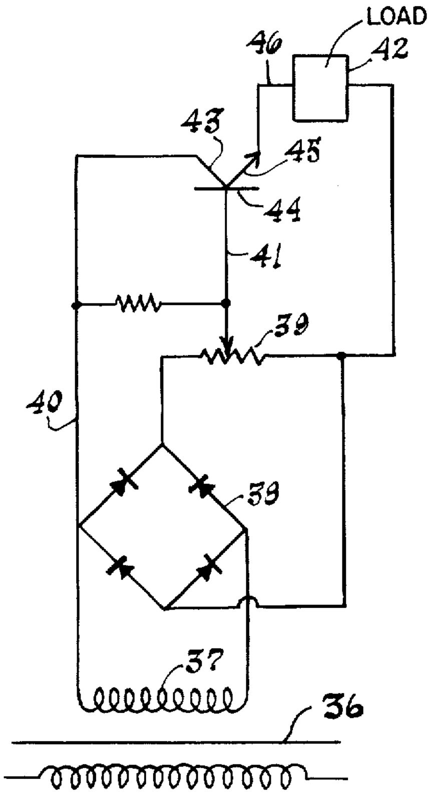
FIG. 3 is a modified schematic circuitry of the present invention.

The invention of the present application, however, may be incorporated into a circuit which includes a transistor device, such as that shown in FIG. 3. In such circuit a transformer 36 is shown having a secondary winding 37 connected to a rectifying means of the bridge configuration 38, the legs of which are connected to a variable control device 39 as well as an AC conductor 40 which in turn is not only connected to the conductor 41 extending between the control device 39 and the load or driven member 42, but in turn is connected to the collector 43 of the transistor with the base 44 connected to the conductor 41 and its emitter 45 connected to the conductor 46 which leads to the load or driven device 42. By this arrangement of supplying a blendable half wave AC signal, the problem normally associated with a S.C.R. device is overcome by omitting the inherent fast rise time of such device, as well as the temperature and integrading requirements, as is inherent in the prior art arrangements.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A power control circuit providing a complete range of signals to a load that varies from "full on" to "full off" comprising:

(a) an AC power source and a transformer providing primary and secondary windings, (b) a full wave rectifier connected to said secondary winding of said transformer, (c) a variable signal control connected in circuit between an output of said rectifier and the load having a full on position for supplying a full wave signal to the load, and a negative return from its full off position to another output of said rectifier, and (d) a circuit connection between said secondary winding and the signal output side of said variable signal control for supplying a half wave AC signal to the full wave signal supplied to the load through said variable signal control.

2. A power control circuit as defined by claim 1 wherein said full wave rectifier is of a bridge configuration.

3. A power control circuit as defined by claim 1 wherein the load is a driven member and said variable signal control is a speed control for said driven member.

4. A power control circuit as defined by claim 1 including a transistor connected in circuit between said variable signal control and the load and adapted to blend a half wave AC signal to the signal output of said variable signal control.

5. A power control circuit as defined by claim 4 wherein said full wave rectifier is of a bridge configuration.

6. A power control circuit as defined by claim 4 wherein the load is a driven member and said variable signal control is a speed control for said driven member.

* * * * *